(12) United States Patent
Fitch et al.

(10) Patent No.: US 8,531,946 B2
(45) Date of Patent: Sep. 10, 2013

(54) BANDWIDTH ASSIGNMENT

(75) Inventors: Michael R Fitch, Felixstowe (GB); Paul D Mitchell, Tollerton (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 421 days.

(21) Appl. No.: 12/863,292

(22) PCT Filed: May 19, 2008

(86) PCT No.: PCT/GB2008/001710
§ 371 (c)(1),
(2), (4) Date: Jul. 16, 2010

(87) PCT Pub. No.: WO2009/050419
PCT Pub. Date: Apr. 23, 2009

(65) Prior Publication Data
US 2010/0309910 A1    Dec. 9, 2010

(30) Foreign Application Priority Data
Oct. 16, 2007   (EP) ..................................... 07254099

(51) Int. Cl.
*H04L 1/00* (2006.01)

(52) U.S. Cl.
USPC ....................................... 370/230; 370/230.1

(58) Field of Classification Search
None
See application file for complete search history.

(56) References Cited

U.S. PATENT DOCUMENTS

| | | | |
|---|---|---|---|
| 6,105,064 A | 8/2000 | Davis et al. | |
| 6,947,445 B1* | 9/2005 | Barnhart | 370/468 |
| 7,099,289 B2* | 8/2006 | Varma | 370/278 |
| 7,242,694 B2* | 7/2007 | Beser | 370/449 |
| 7,298,728 B2* | 11/2007 | Golla et al. | 370/347 |
| 7,706,391 B2* | 4/2010 | Matsuo et al. | 370/412 |
| 2004/0120276 A1* | 6/2004 | Golla et al. | 370/321 |
| 2004/0202181 A1* | 10/2004 | Mitchell | 370/395.4 |
| 2006/0187955 A1 | 8/2006 | Rezaiifar et al. | |
| 2006/0253763 A1* | 11/2006 | Oliva et al. | 714/746 |

FOREIGN PATENT DOCUMENTS
EP    1 037 405    9/2000

OTHER PUBLICATIONS

International Search Report for PCT/GB2008/001710, mailed Jul. 11, 2008.
Mitchell et al., "Bandwidth assignment scheme for On-Off type data traffic via satellite", *Electronics Letters*, vol. 37, No. 19, Sep. 13, 2001, pp. 1191-1193, XP006017249.
Office Action dated Sep. 10, 2010 issued in corresponding European Application No. 08750641.6 (1 pg.).
Applicant Response to Sep. 10, 2010 Office Action issued in corresponding European Application No. 08750641.6 (3 pgs.).

\* cited by examiner

*Primary Examiner* — Hassan Phillips
*Assistant Examiner* — Ajay Cattungal
(74) *Attorney, Agent, or Firm* — Nixon & Vanderhye P.C.

(57) ABSTRACT

A demand assignment process for a packet switching communications system in which a terminal requests capacity from a scheduler for the transmission of bursts of packets, and in which the scheduler determines whether the burst is complete by identifying gaps in the traffic stream and preferentially allocates capacity to those terminals currently in the middle of transmitting a burst, allowing transmission of further packets of the burst.

12 Claims, 3 Drawing Sheets

BANDWIDTH ASSIGNMENT

This application is the U.S. national phase of International Application No. PCT/GB2008/001710 filed 19 May 2008 which designated the U.S. and claims priority to EP 07254099.0 filed 16 Oct. 2007, the entire contents of each of which are hereby incorporated by reference.

BACKGROUND AND SUMMARY

This invention relates to bandwidth assignment schemes for packet switching communications systems. In contrast to conventional circuit switched systems, in which an end-to-end link is maintained for the duration of a telephone call or the like, a packet switching system transmits information as a series of individual "packets" of data, each of which carries address data to allow it to be routed to its intended destination. The receiving terminal then reassembles the packets to retrieve the original message. Such arrangements make better use of the available bandwidth, but because of the variable delay in packet delivery are more suited to data than voice transmission.

U.S. Pat. No. 6,105,064 (Davis) describes a dynamic window sizing system which includes a process to estimate the overall bitrate required to maintain one or more datastreams, taking into account the average duration of gaps between packets in each datastream. However, the efficient use of the capacity reserved requires the transmission of the packets to be scheduled efficiently.

The achievable delay and utilisation performance of the channels of a packet switching system are governed by the underlying bandwidth assignment scheme. Satellite Medium Access Control (MAC) protocols for data traffic have traditionally employed Demand Assigned Multiple Access (DAMA) with requests for bandwidth made on a regular basis, derived from the instantaneous queue levels at the ground terminals. Thus any terminal having more than a predetermined number of packets awaiting delivery makes regular requests for bandwidth. As bandwidth becomes available one such terminal is selected for transmission of its next packet. Such a system is described, for example, by Mohamed and Le-Ngoc in a paper entitled "Performance Analysis of Combined/Free Demand Assigned Multiple Access (CFDAMA) Protocol for Packet Satellite Communications, (IEEE New Orleans, May 1994)

A typical satellite uplink frame format is shown in FIG. 1, consisting of a series of data transmission slots D, F interleaved with DAMA request slots R. A request algorithm for such a scheme is given in FIG. 3. Ground terminals 71 (see FIG. 6) make requests for bandwidth accompanying their uplink packet transmissions in the adjacent request slots, as and when required. At the time a packet is to be transmitted in one of the slots D (step 31) the terminal 71 determines its current packet queue size (step 32) and the number of slots already requested which have not yet been satisfied (step 33). If the queue size is greater than the number of slots already requested (because 35 further packets have been added to the queue since the previous packet was transmitted), it then transmits a request for further slots (step 34) based on the instantaneous ground terminal queue size and the number of outstanding slot requests (less the packet currently being transmitted). At the satellite 72, the scheduler 73 assigns slots on a frame-by-frame basis. In the first instance slots are demand-assigned to terminals based on requests queued at the scheduler in a first come first serve (FCFS) manner, with each terminal 71 being allocated a run of contiguous slots D based on the number of slots requested. In the absence of any queued requests, successive slots in the frame are allocated one-by-one on a free assigned round robin basis to all terminals in the system. To give terminals that have not requested bandwidth for a while a better chance of obtaining a free assigned slot, terminals are put to the bottom of the round-robin free assignment list subsequent to being allocated demand-assigned slots.

A geostationary satellite orbit is approximately 33,500 km above the earth's surface. For most points on the earth's surface the nearest geostationary satellite is not at the zenith, so the distance to the satellite is even greater—up to 40,000 km. The resulting long propagation delay in geo-stationary earth orbit (GEO) satellite links inhibits the effectiveness of such schemes. A "hop", the propagation delay for transmission of a radio signal up to a satellite and back down to the ground, is about 0.25 seconds, but varies depending on the elevation angle to the satellite. The distance to the satellite is a minimum (about 0.24 seconds) when directly overhead an earth station at the equator, and it is a maximum (about 0.28 seconds) when an earth station is located at the edge of global coverage (from where the satellite is just above the horizon). Since a request for bandwidth has to be transmitted to the scheduler and the reply returned before a packet can be transmitted (which has itself then to be transmitted up to the satellite and back), each packet is delayed by at least two satellite hops (in addition to any processing delay) if the scheduler is located on the satellite, or more if it is on the ground, or distributed. In order to circumvent the long delay, DAMA is often combined with either random access (e.g. Slotted ALOHA) or a form of free assignment of bandwidth as found in the Combined Free/Demand Assignment Multiple Access (CFDAMA) schemes discussed by Le-Ngoc et al, in "Performance of combined free/demand assignment multiple-access schemes in satellite communications", *International Journal of Satellite Communications*, vol. 14, no. 1, pp. 11-21, 1996. Leland et al, in "On the self-similar nature of Ethernet traffic (extended version)", IEEE/ACM Transactions on Networking, vol. 2, no. 1, pp.1-15, 1994 describes how modern computer Local Area Network (LAN) traffic exhibits a burstiness characteristic over a wide range of time scales.

The present invention presents a novel packet reservation system for data traffic, suited to handling long bursts of packets from ON-OFF type traffic sources.

International patent specification WO03/017589 describes a demand assignment process for a packet switching communications system in which a terminal requests capacity from a scheduler for the transmission of bursts of packets, and in which the terminal transmits position signals to the scheduler with one or more of the packets, the position signals being indicative of those packets' positions in a burst. Such a position signal may indicate the end of a burst, or the beginning of a burst, the latter also including an indication of the length of the burst. The position signals are used by the scheduler to identify which terminals have transmitted part of a burst but have further packets of that burst awaiting transmission, and prioritises the allocation of capacity to those terminals to allow transmission of further packets of the partly transmitted burst. This system differs from prior art arrangements in that each terminal provides an indication of how the packets in its queue are arranged in bursts, and gives priority to transmission of packets to complete a burst that has already been partially transmitted, packets awaiting transmission that make up subsequent bursts are therefore given less significance in the allocation process.

The scheduler identifies, from the position signals transmitted by the terminals, whether any terminals are not part way through transmission of a burst, (that is to say, they have completed one burst and have not started another), and if there are any such terminals, the scheduler allocates capacity to allow those terminals to request transmission of new bursts should they require to do so. The proportions of the capacity allocated to allow such terminals to request capacity, and the capacity allocated to terminals already part way through a burst, may be varied according to the current number of terminals currently in each of those conditions.

However, in this prior art system, it is necessary that the transmitters are modified to provide the position signals, and the position signals themselves add to the signalling overhead to be carried. The scheduler must also be able to cope with corruption of the position signals.

The present invention provides an improved process in which there is provided a demand assignment process for a packet switching communications system in which a plurality of terminals each request capacity from a scheduler for the transmission of bursts of packets, and the scheduler identifies which terminals have transmitted part of a burst but have further packets of that burst awaiting transmission, and prioritises the allocation of capacity to those terminals to allow transmission of further packets of the partly transmitted burst, characterised in that the scheduler identifies the end of a burst by detecting gaps in transmission of data in excess of a predetermined duration.

The invention also extends to a scheduler for a packet switching communications system comprising allocation means for allocating capacity to a plurality of terminals for the transmission of bursts of packets, having means for determining which terminals have transmitted part of a burst but have further packets of that burst awaiting transmission, wherein the allocation means is arranged to prioritise the allocation of capacity to those terminals to allow transmission of further packets of the burst, and characterised in that the determination means comprises detection means for detecting gaps in transmission of data in excess of a predetermined duration.

Preferably the scheduler comprises means for setting or maintaining a flag at a first indication in respect of a terminal when the first packet of a burst is received from that terminal, and resetting the flag to a second indication when no packet has been received from that terminal for a predetermined period. Preferably the scheduler, having identified which of the terminals are not part way through transmission of a burst, allocates capacity to allow such terminals to request transmission of new bursts. The proportions of the capacity allocated to terminals not part way through a burst, and the capacity allocated to terminals already part way through a burst, may be varied according to the current number of terminals in each of those conditions.

BRIEF DESCRIPTION OF THE DRAWINGS

An embodiment of the invention will now be described, with reference to the drawings, in which.

DETAILED DESCRIPTION

Figure 6:
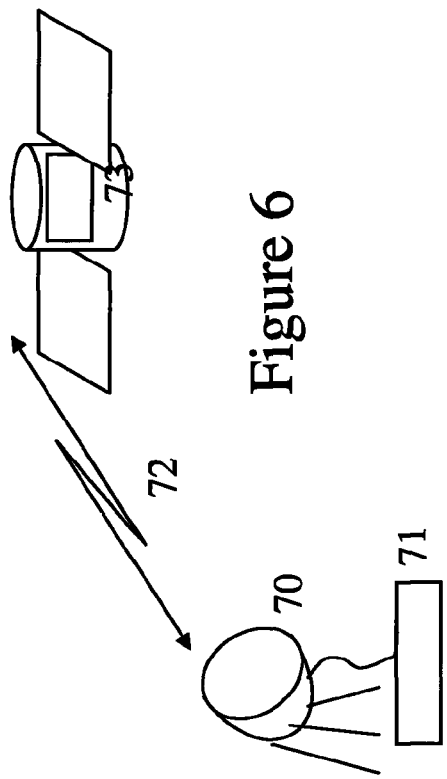
FIG. 6 shows schematically the elements co-operating to perform the invention.

Referring firstly to FIG. 6, each satellite ground station 70 is associated with one or more terminals 71 which operate to transmit packet data to the satellite 72, which relays them to other ground stations (not shown). The allocation of slots in the packet frame is controlled by a sequencer 73 located in the satellite 72.

Figure 1:
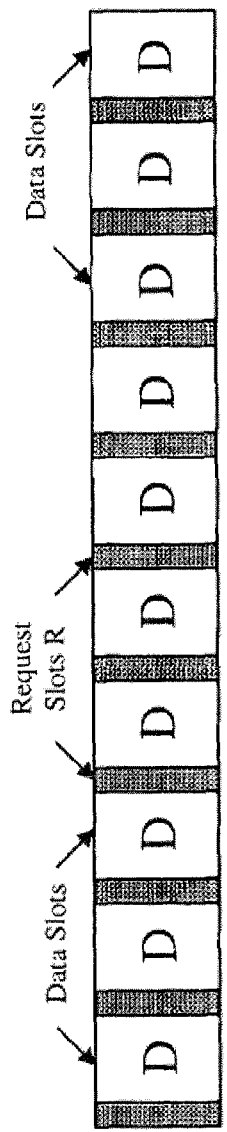
FIG. 1 shows a frame format used in a conventional system
Figure 3:
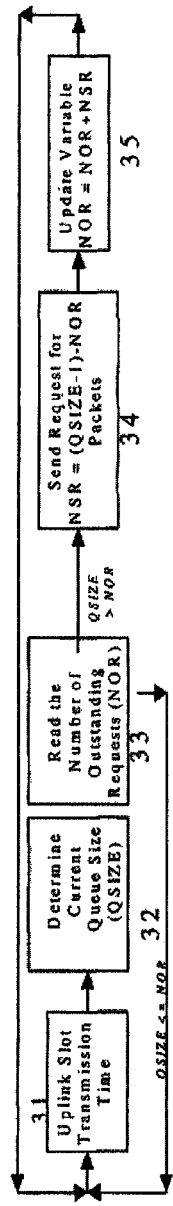
FIG. 3 shows a request algorithm for use in the conventional prior art arrangement already discussed

A conventional allocation scheme is shown in FIG. 1. This consists of a series of data transmission slots D, F interleaved with DAMA request slots R. The request algorithm is given in FIG. 3. Ground terminals 70 transmit requests for bandwidth with their uplink packet transmissions, using the adjacent request slots R as and when required. As has been stated, in the conventional arrangement the ground terminals 71 each request a number of slots D based on the instantaneous ground terminal total queue size (irrespective of whether they form part of one burst or several), and the number of outstanding slot requests.

Figure 2:
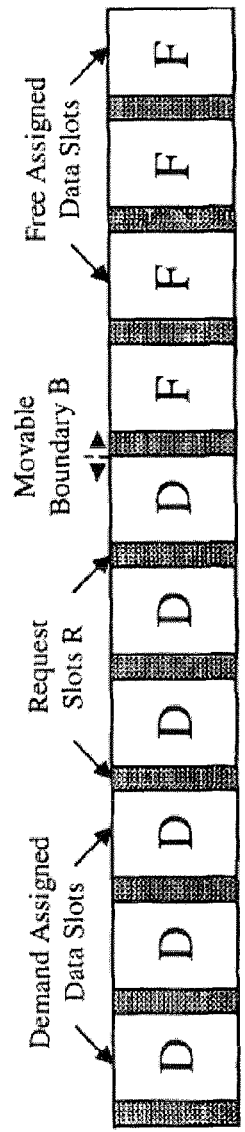
FIG. 2 shows a frame format suitable for use in the invention
Figure 4:
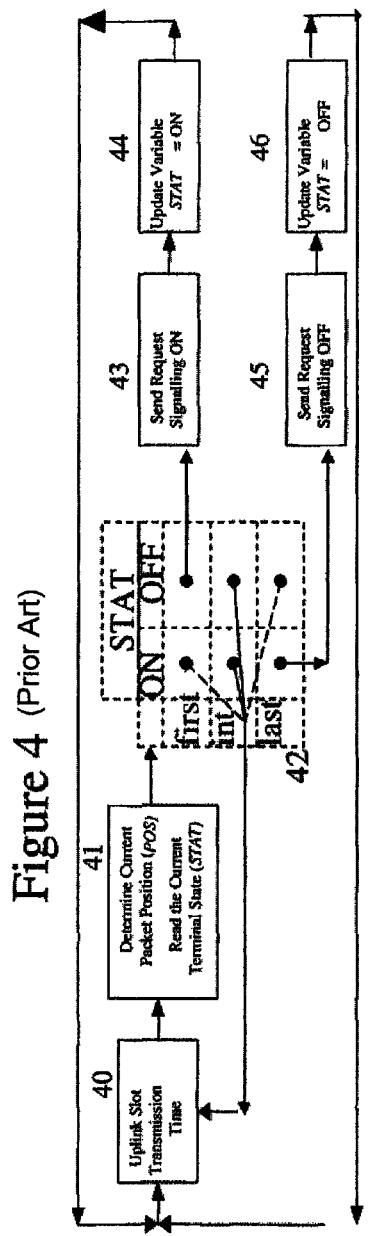
FIG. 4 shows a request algorithm, for use in the system according to the system used in the prior art reference WO03/017589

The frame format used in the prior art system described in International patent specification WO03/017589 is shown in FIG. 2, and is similar to the conventional arrangement shown in FIG. 1 in that it consists of a series of data transmission slots D, F interleaved with DAMA request slots R. The algorithm used in this prior art system is shown in FIG. 4. The requests take the form of bandwidth signalling on a burst-by-burst basis. Terminals 71 are flagged in the scheduler 73 as existing in one of two states, ON or OFF. When a packet in a burst is transmitted on the uplink (step 40) the terminal 71 determines the position (POS) of the packet in the burst (step 41). The terminal 71 labels the first and/or last packets in order to indicate their position in the burst to the scheduler 73. The first packet of a burst may carry a label not only indicating to the scheduler 73 that it is the first packet, but also indicating the length of the burst. In this case the scheduler 73 need only count the packets to identify the last one in the burst, and thus can re-set the terminal status without a further specific signal being transmitted. However, this arrangement is only possible if the length of the burst is already known to the terminal, so it is not possible to use this technique unless the entire burst is already in the queue at the terminal 71. Alternatively, the last packet of each burst may be labelled, allowing the scheduler to then recognise the next packet to arrive from the same terminal as being the first packet of the next burst.

As seen in the truth table 42 (FIG. 4), when the scheduler 73 identifies a packet as the first of a burst, it changes the setting for the originating terminal to the ON state (step 43), and sets its status flag to ON (step 44). When the last packet of each burst is transmitted, the scheduler 73 changes the status of the relevant terminal 71 back to the OFF state (step 45) and returns its status flag to OFF (step 46). If the packet is neither the first nor the last, but some intermediate packet, the signalling and status flag remain unchanged. (The truth table also shows two other conditions, when a packet labelled "first" is received when the terminal state is already ON, or a "last" packet is received when the terminal state is OFF. Both conditions can occur as the result of loss or corruption of an earlier packet. In each case the terminal state is already in the desired condition, so steps 43-46 are again omitted)

Figure 5:
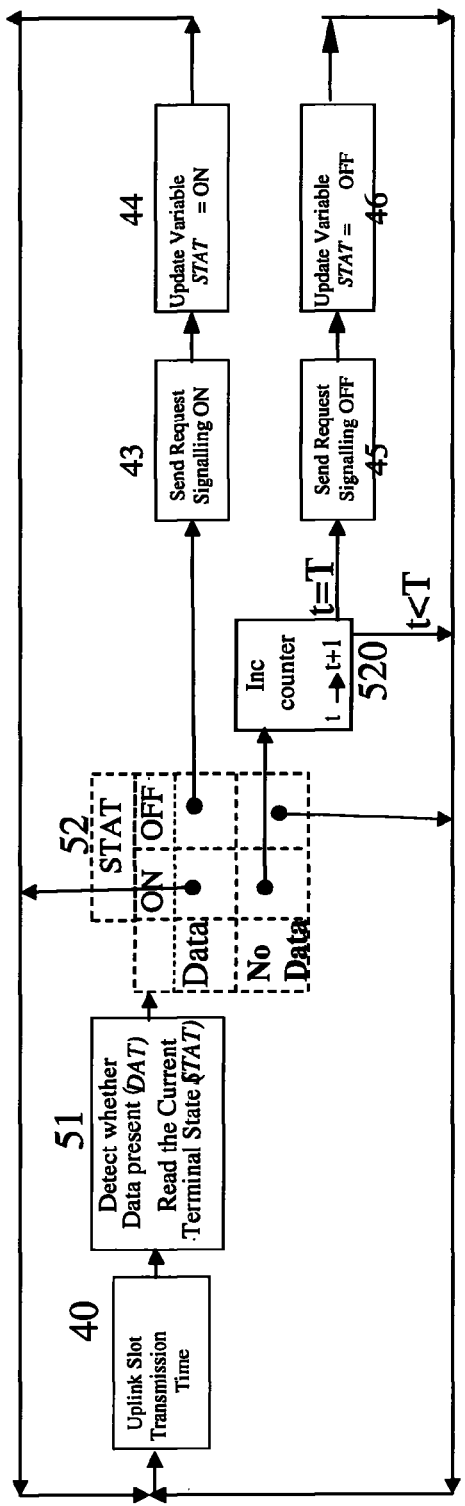
FIG. 5 shows a request algorithm for use in the system according to the invention

A process according to the present invention is illustrated in FIG. 5. Those steps common with the prior art process of FIG. 4 are indicated by the same reference numerals 40, 43, 44, 45, 46. In this process no position indicators are transmitted. Instead, the scheduler 73 detects the presence or absence of data (step 51) to identify the beginnings and ends of data bursts. According to the truth table 52, if the terminal status is OFF when data is detected, the flag for that terminal is set to ON (steps 43, 44). It is maintained at ON whilst data is present. If data ceases a counter is started which measures a time "t" (step 520). If the value "t" reaches a threshold value "T" before any further data bursts are received, thereby signifying the end of a burst, the flag is reset to OFF (step 45, 46)

As in the prior art system, the scheduler 73 in the satellite 72 maintains two lists: one containing the terminals whose status in ON and one containing the terminals whose status is OFF. Each frame consists of a variable number of free assigned slots determined by:

$$\text{Number of free slots} = \left[\frac{N_{OFF}}{N_{TOT}}\right] * S_{TOT} * \text{FREE}_{MAX} \quad N_{OFF} < N_{TOT}$$
$$= S_{TOT} \quad N_{OFF} = N_{TOT}$$

$$\text{Number of demand slots} = S_{TOT} - \text{Number of free slots}$$

Where, $N_{OFF}$=Number of terminals in the OFF state
$N_{TOT}$=Total number of terminals
$S_{TOT}$=Total number of slots in the frame
$\text{FREE}_{MAX}$=Maximum proportion of free slots Thus, provided that at least one terminal is in the "ON" state, a proportion of the slots (at least $1-\text{FREE}_{MAX}$) are demand-assigned. The value of $\text{FREE}_{MAX}$ is set such that when demand is low (but non-zero) demand-assigned slots are not delayed by an excessive number of free-assigned slots. This proportion increases as the number of terminals in the "ON" state increases. Similarly, provided that at least one terminal is in the "OFF" state, the number of free slots is non-zero.

The scheduler then allocates bandwidth to each terminal on a frame-by-frame basis, with the demand-assigned and free-assigned slots allocated to the ON and OFF terminals respectively. There is no need to request capacity based on queue size. The number of available demand-assigned slots D and free-assigned slots F changes dynamically to suit the instantaneous requirements, by changing the position of the boundary B shown in FIG. 2. When all the nodes are OFF, the entire frame is free-assigned to minimise the signalling delay for terminals following the start of a burst.

If the labelling of the packets includes an indication of burst length, the scheduler 73 can be arranged to distribute the demand-assigned slots between the bursts currently in progress in accordance with burst size. This may be done in several different ways, for example in order to weight the allocation in favour of the larger bursts so that subsequent bursts from the same terminal are not delayed unduly, or to give preference to any bursts which can be completed in the current frame, thereby releasing capacity for other bursts from the same or other terminals 71.

It should be noted that it is burst size, and not queue size, which determines the allocation of capacity in these embodiments. The size of a queue is constantly changing, requiring much more frequent signalling from the terminal 71 to the scheduler 73 than is the case when burst size is the determining factor. However, the size of an individual burst is fixed. With conventional DAMA schemes for data, traffic requests have to be made for transmission of each packet in the queue, resulting in delays whilst such requests are processed. In a satellite system such delays can be significant because of the distance of the satellite from the terminals. In the present invention, delays are minimised because once a terminal has signalled ON, slots are continually provided without the need for repeated requests. In effect, the connectionless packet bursts are treated like a individual connection-oriented (circuit-switched) applications by providing a continual supply of capacity to a terminal for as long as necessary to transmit an individual burst. The minimum delay for each slots is reduced to one satellite hop instead of two, since no further requests for capacity have to be made whilst the status is set at ON.

The invention provides terminals with access rights to the demand assigned bandwidth, which is shared equally between them. The maximum channel throughput is dependent on the number of terminals currently being supported with no hard limit on the number of terminals that can be supported, simply a gradual reduction in the bandwidth available to each terminal as the number of active terminals increases.

What is claimed is:

1. A demand assignment process for a packet switching communications system in which a plurality of terminals each request capacity from a scheduler for the transmission of bursts of packets, and the scheduler identifies which terminals have transmitted part of a burst but have further packets of that burst awaiting transmission, and prioritises the allocation of capacity to those terminals to allow transmission of further packets of the partly transmitted burst, wherein the scheduler detects gaps in transmission of data in excess of a predetermined duration and defines each such gap as determining the position of the end of a burst and wherein the allocation of the capacity to the terminals is performed without transmission of data indicating position of a packet in the burst.

2. A demand assignment process according to claim 1, wherein the scheduler sets or maintains a flag at a first indication in respect of a terminal when the first packet of a burst is received from that terminal, and resets the flag to a second indication when no packet has been received from that terminal for a predetermined period.

3. A demand assignment process according to claim 1 wherein the scheduler allocates capacity to terminals which are not part way through transmission of a burst to allow such terminals to request transmission of new bursts.

4. A demand assignment process according to claim 3 wherein the proportions of the capacity (F) allocated to terminals not part way through a burst, and the capacity (D) allocated to terminals already part way through a burst, are varied according to the current number of terminals in each of those conditions.

5. A communication device comprising: a queue and a scheduler; wherein the scheduler allocates capacity to a plurality of terminals for the transmission of bursts of packets by detecting gaps in transmission of data in excess of a predetermined duration, defines each such gap as identifying the end of a burst, and wherein the scheduler is arranged to prioritise the allocation of capacity to terminals which have transmitted part of a burst but have further packets of that burst awaiting transmission, so as to allow transmission of further packets of the burst, and wherein scheduler is configured to perform the allocation of the capacity to the terminals without transmission of data indicating position of a packet in the burst.

6. A scheduler according to claim 5, arranged to set or maintain a flag at a first indication in respect of a terminal when the first packet of a burst is received from that terminal, and resetting the flag to a second indication when no packet has been received from that terminal for a predetermined period.

7. A scheduler according to claim 6, arranged to identify terminals which are not part way through transmission of a burst, and arranged to allocate capacity to allow such terminals to request transmission of new bursts.

8. A scheduler according to claim 7, arranged to vary the proportions of the capacity (F) allocated to terminals not part way through a burst, and the capacity (D) allocated to terminals already part way through a burst, according to the current number of terminals in each of those conditions.

9. A system comprising:
a computer system, comprising a computer processor, the computer system being configured to allocate capacity to a plurality of terminals for the transmission of bursts of packets by being configured at least to:
  detect gaps in transmission of data in excess of a predetermined duration;
  define each such gap as identifying the end of a burst;
  prioritize the allocation of capacity to terminals which have transmitted part of a burst but have further packets of that burst awaiting transmission, so as to allow transmission of further packets of the burst; and
  perform the allocation of the capacity to the terminals without transmission of data indicating position of a packet in the burst.

10. A system according to claim 9, the computer system being further configured to set or maintain a flag at a first indication in respect of a terminal when the first packet of a burst is received from that terminal, and reset the flag to a second indication when no packet has been received from that terminal for a predetermined period.

11. A system according to claim 10, the computer system being further configured to identify terminals which are not part way through transmission of a burst and allocate capacity to terminals to allocate capacity to allow such terminals to request transmission of new bursts.

12. A system according to claim 11, the computer system being further configured to vary the proportions of the capacity (F) allocated to terminals not part way through a burst, and the capacity (D) allocated to terminals already part way through a burst, according to the current number of terminals in each of those conditions.

* * * * *

UNITED STATES PATENT AND TRADEMARK OFFICE
CERTIFICATE OF CORRECTION

PATENT NO.       : 8,531,946 B2
APPLICATION NO.  : 12/863292
DATED            : September 10, 2013
INVENTOR(S)      : Fitch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 513 days.

Signed and Sealed this
Fifteenth Day of September, 2015

Michelle K. Lee
*Director of the United States Patent and Trademark Office*